US012148583B2

(12) United States Patent
de Borba et al.

(10) Patent No.: US 12,148,583 B2
(45) Date of Patent: Nov. 19, 2024

(54) REMOVABLE BEZEL ASSEMBLY FOR A COOKING APPLIANCE

(71) Applicant: WHIRLPOOL CORPORATION, Benton Harbor, MI (US)

(72) Inventors: Daniel Fernando de Borba, Joinville (BR); Hsin-Fei Huang, St. Joseph, MI (US); Mauricio Fernando Zago, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 165 days.

(21) Appl. No.: 17/878,559

(22) Filed: Aug. 1, 2022

(65) Prior Publication Data

US 2024/0038457 A1 Feb. 1, 2024

(51) Int. Cl.
*H01H 3/10* (2006.01)
*F24C 3/12* (2006.01)
*F24C 7/08* (2006.01)

(52) U.S. Cl.
CPC ............... *H01H 3/10* (2013.01); *F24C 3/122* (2013.01); *F24C 7/082* (2013.01)

(58) Field of Classification Search
CPC ............ H01H 3/10; H01H 3/08; H01H 19/14; H01H 19/60; F24C 3/122; F24C 7/082; F24C 3/12; F24C 7/08
See application file for complete search history.

(56) References Cited

U.S. PATENT DOCUMENTS

| | | | | |
|---|---|---|---|---|
| 2,005,792 | A | 6/1935 | Leins | |
| 5,509,174 | A | 4/1996 | Worrell | |
| 8,434,199 | B1 | 5/2013 | Bowen et al. | |
| 10,174,951 | B2 | 1/2019 | Choi | |
| 11,098,903 | B2 | 8/2021 | Dolinski et al. | |
| 11,243,556 | B2 * | 2/2022 | Bhosale | G05G 5/005 |
| 11,788,730 | B2 * | 10/2023 | Daufenbach | F24C 3/126 126/1 R |
| 2017/0191671 | A1 | 7/2017 | Chambers et al. | |

* cited by examiner

*Primary Examiner* — Lheiren Mae A Caroc
(74) *Attorney, Agent, or Firm* — Price Heneveld LLP

(57) ABSTRACT

A bezel assembly for a control panel of a cooking appliance. The bezel assembly includes a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating components of the control knob assembly. A plurality of cam fingers are configured to be articulated radially outwardly for interfacing with an interior surface of the control panel.

18 Claims, 11 Drawing Sheets

REMOVABLE BEZEL ASSEMBLY FOR A COOKING APPLIANCE

FIELD OF THE DISCLOSURE

The present disclosure generally relates to a bezel assembly, and, more specifically, to a bezel assembly for a cooking appliance that can be easily installed.

BACKGROUND

Cooking appliances, particularly stoves and cooktop devices, are provided with burners connected to gas flow control valves that allow a user to control the heat generated by the burners. These cooking appliances are also traditionally provided with control knobs that actuate the gas flow control valves, generally in a rotational manner.

A bezel is typically around and between the control knob and an exterior of the cooking appliance to cover gaps around the control knob for both safety and aesthetic purposes. These bezels are traditionally installed during assembly of the cooking appliance as a long-term component. As such, bezels are not easily removed during servicing and compatibility can also be an issue if the bezel needs to be replaced because cooking appliances typically have specific bezel connection mechanisms. Because bezels cannot be easily removed and replaced, removal and finding a compatible part can be expensive, time consuming, and create a risk of damaging an exterior of the cooking appliance or the gas flow valve during removal. In addition, once attached, the bezel becomes a long-term aesthetic feature of the cooking device, which cannot be easily removed and replaced with a compatible bezel aligned with a user's particular aesthetic preference.

Accordingly, the present disclosure relates to a bezel assembly that can be easily installed and replaced for personal preferences or servicing and is compatible with a variety of cooking appliance architectures.

SUMMARY OF THE DISCLOSURE

According to one aspect of the present disclosure, a bezel assembly for a control panel of a cooking appliance is provided. The bezel assembly comprises a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating components of the control knob assembly. At least one cam finger is configured to be articulated radially outwardly for interfacing with an interior surface of the control panel.

According to another aspect of the present disclosure, a bezel assembly for a control panel of a cooking appliance is provided. The bezel assembly comprises a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating components of the control knob assembly. A plurality of cam fingers have an unlocked position and a locked position wherein the plurality of cam fingers are articulated radially outwardly from the unlocked position. A key includes a plurality of actuating posts that move the cam fingers between the unlocked and locked positions.

According to yet another aspect of the present disclosure, a bezel assembly for a control panel of a cooking appliance is provided. The bezel assembly comprises a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating the body portion. The rim portion includes a plurality of cam fingers having an unlocked position and a locked position, wherein the plurality of cam fingers are articulated radially outwardly from the unlocked position. The body portion includes a plurality of actuating posts that move the cam fingers between the unlocked and locked positions with relative rotation between the body portion and the rim portion. The cam fingers include elastic memory towards the unlocked position.

These and other features, advantages, and objects of the present disclosure will be further understood and appreciated by those skilled in the art by reference to the following specification, claims, and appended drawings.

Figure 1:
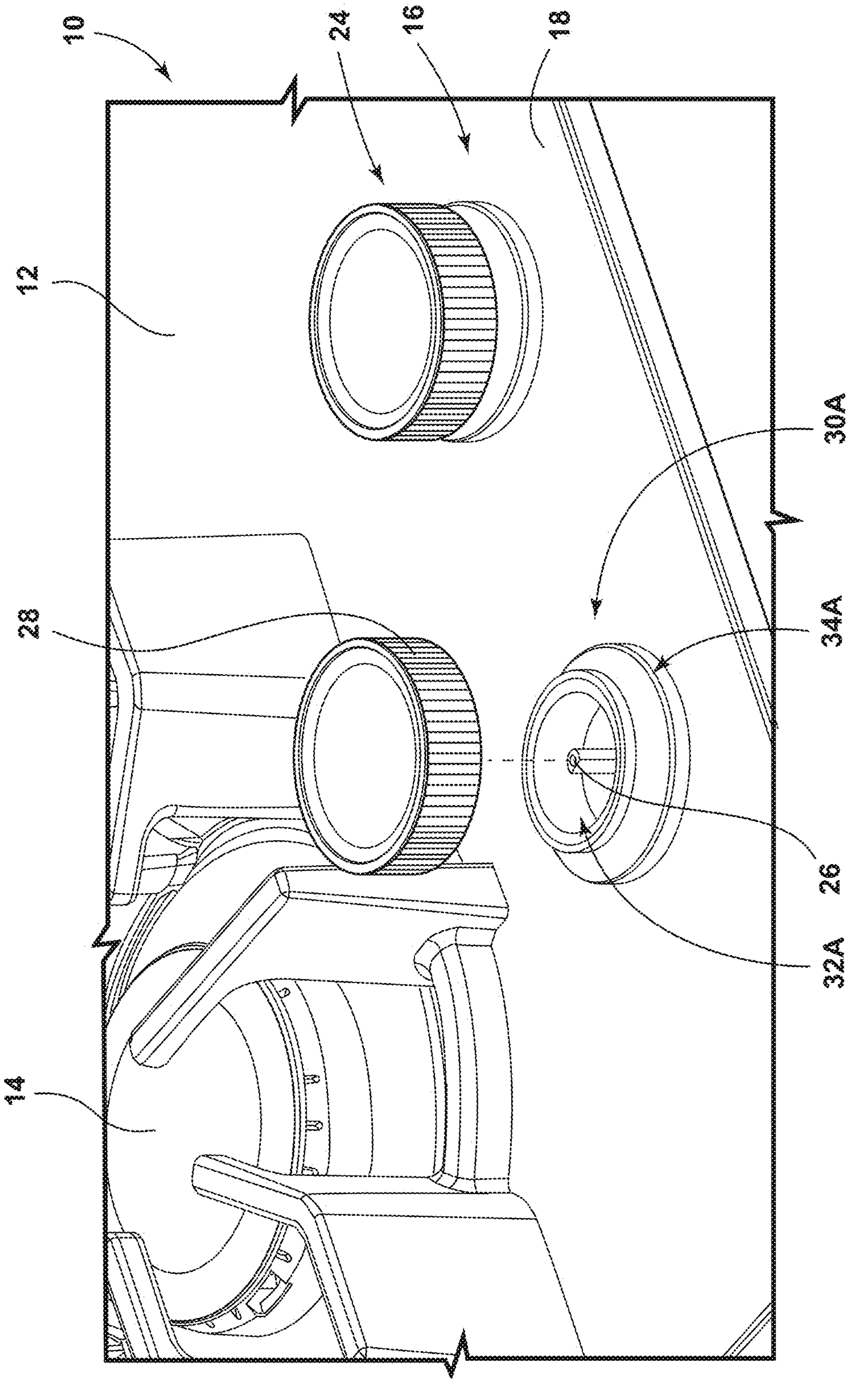
FIG. 1 is a top perspective view of a cooking appliance with a series of burners and control knob assemblies according to an aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a bezel assembly with at least one cam finger configured to be articulated radially outwardly for interfacing with an interior surface of the control panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIG. 1, reference numeral 10 generally designates a cooking appliance, such as a freestanding range, an oven, a cooktop without an oven, and/or the like. The cooking appliance 10 includes a cooktop 12 having one or more burners 14 located thereon. The cooking appliance 10 further includes a control panel 16 that may be coextensive with the cooktop 12 and/or located on a planar surface. The control panel 16 defines an exterior surface 18 and an interior surface 20. The control panel 16 further defines one or more apertures 22 (FIGS. 2 and 12) extending through the exterior surface 18 and the interior surface 20. A control knob assembly 24 is located at each of the one or more apertures 22. The control knob assembly 24 includes a burner control 26 and a knob 28 operably connected to the burner control 26. In operation, actuation of the burner control 26 via the knob 28 effectuates an output to an associated burner 14.

With continued reference to FIG. 1, a bezel assembly 30A is illustrated in accordance with a first embodiment. Unless otherwise indicated, the first embodiment may share all of the same features, functions, materials, and constructions of the other embodiments described herein. The bezel assembly 30A includes a body portion 32A that is located in each of the apertures 22 and a rim portion 34A that covers an interface between the body portion 32A and a delimiting surface of the control panel 16 that defines the aperture 22. More particularly, the body portion 32A may be moveable in the aperture 22 between an unlocked position (FIG. 9) and a locked position. In some embodiments, the locked position includes a first locked position (FIG. 10) and a second locked position (FIG. 11). In the unlocked position, the body portion 32A can be inserted and removed from the aperture 22 with minimal effort. In the first and second locked positions, the body portion 32A includes an interface feature that is selectively engaged and clamped against with the interior surface 20 of the control panel 16, such that it cannot be removed. The body portion 32A and the rim portion 34A may be integrally formed.

Figure 2:
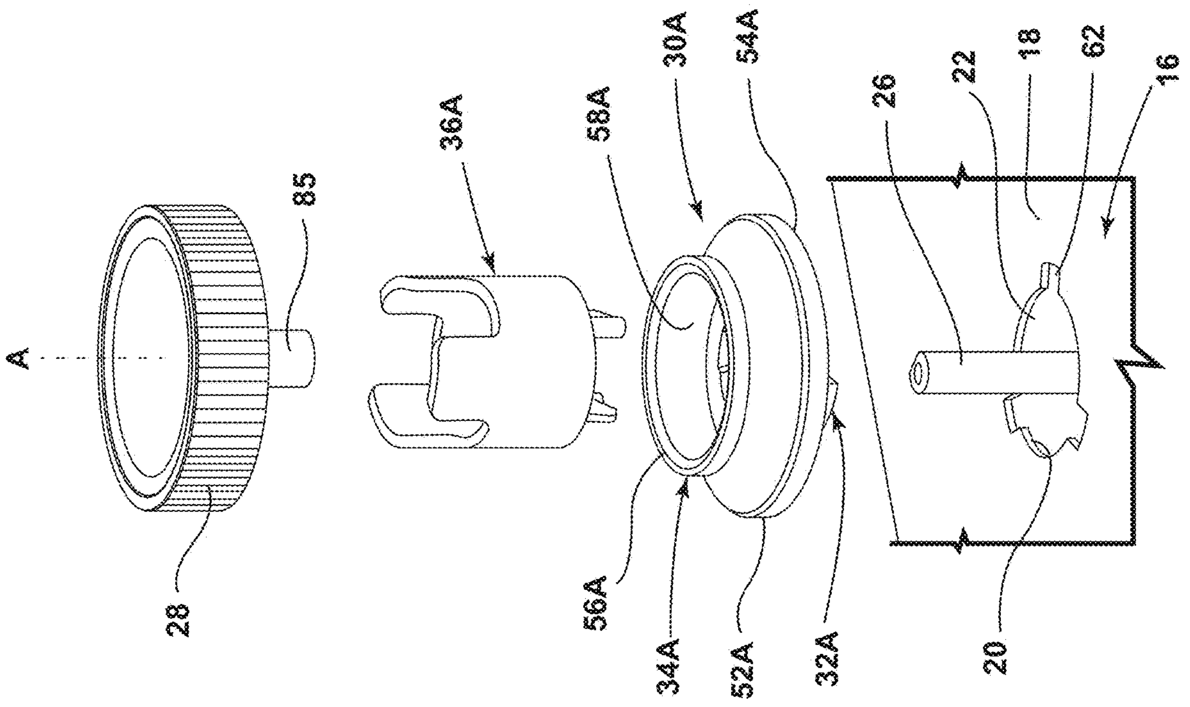
FIG. 2 is a disassembled view illustrating a first embodiment of a bezel assembly for the control knob assembly according to an aspect of the present disclosure.
Figure 4:
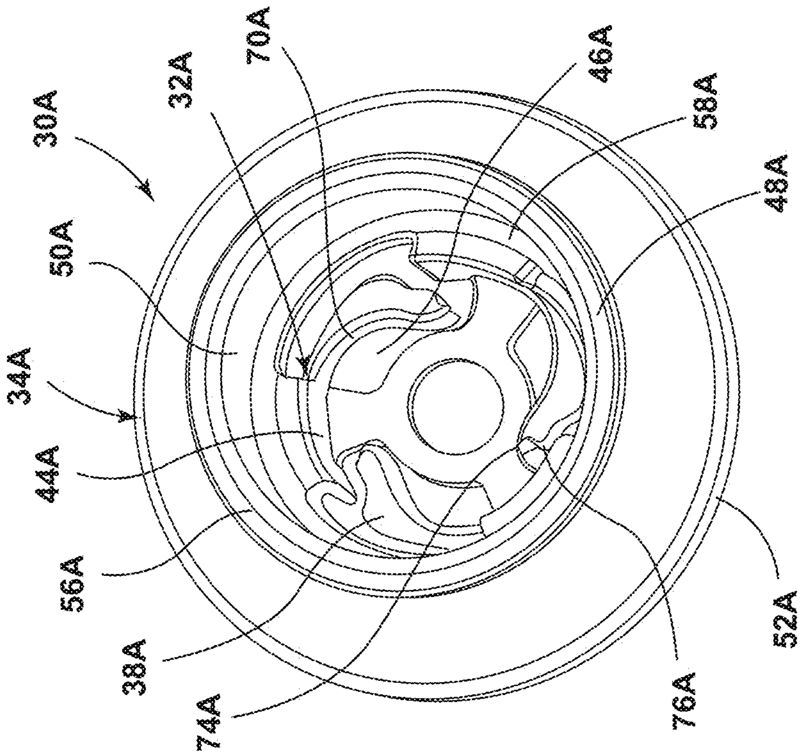
FIG. 4 is a top perspective view of the bezel assembly according to an aspect of the present disclosure.

FIG. 2 is a disassembled view of the bezel assembly 30A. A key 36A is insertable into the body portion 32A to effectuate movement between the unlocked and locked positions. The bezel assembly 30A extends along an axis A between the body portion 32A and the rim portion 34A. The body portion 32A includes interface feature (i.e. at least one cam finger 38A) and a stem 40A extending between the rim portion 34A from the cam finger 38A. The at least one cam finger 38A may include a plurality of cam fingers 38A (e.g. two, three, four, five, or more) that may be substantially equally spaced about the axis A. The at least one cam finger 38A is moved radially outwardly to flare outwardly from the stem 40A, with respect to the axis A, in the locked position. The body portion 32A further includes a body exterior surface 42A (FIG. 3) and a body interior surface 44A (FIG. 4). The body interior surface 44A defines a channel 46A for accommodating features of the control knob assembly 24 and the axis A extends through the channel 46A. The rim portion 34A includes a rim exterior surface 48A and a rim interior surface 50A (FIG. 4). The rim exterior surface 48A may define an outward flare 52A towards a bottom surface 54A of the rim portion 34A. In operation, the bottom surface 54A of the rim portion 34A contacts the exterior surface 18 of the control panel 16. As such, the outward flare 52A conceals the aperture 22 at the bottom surface 54A but narrows towards a top surface 56A of the rim portion 34A so not to impinge upon interaction with the knob 28. The rim interior surface 50A defines an opening 58A and the axis A extends through the opening 58A for locating the body portion 32A therein.

Figure 3:
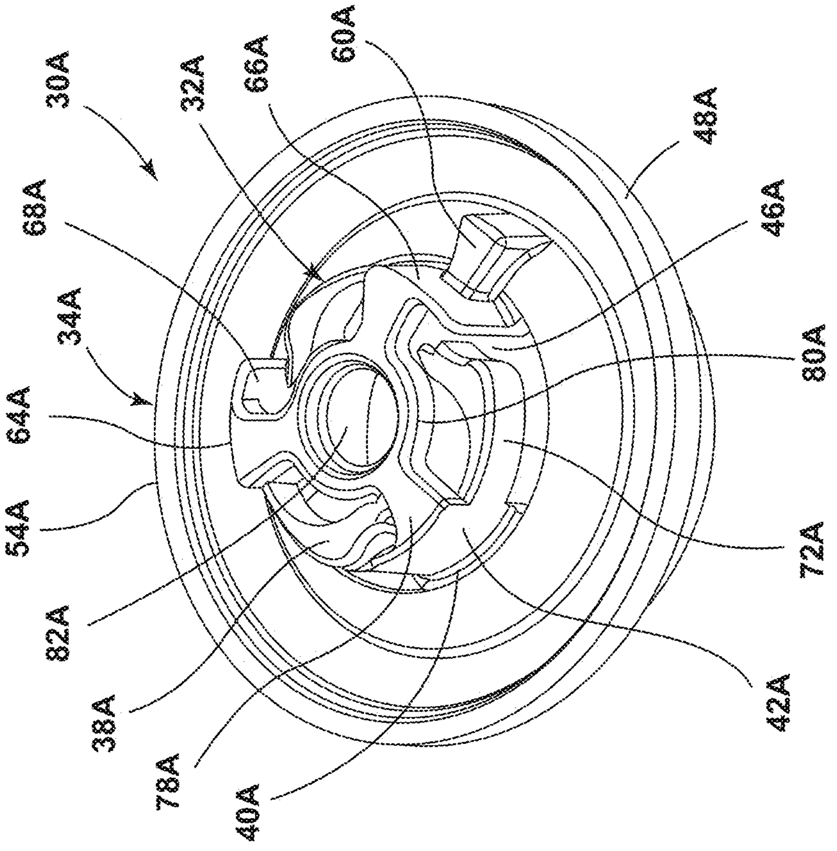
FIG. 3 is a bottom perspective view of the bezel assembly according to an aspect of the present disclosure.

FIG. 3 is a bottom perspective view of the bezel assembly 30A. The bezel assembly 30A defines at least one cooktop connection feature, for example, at least one anti-rotation projection 60A that interlocks with a bay portion 62 of the aperture 22 (FIG. 2). During assembly, the at least one anti-rotation projection 60A is inserted into the bay portion 62 and prevents rotation of the bezel assembly 30A with respect to the cooktop 12. The cam fingers 38A are illustrated in the unlocked position, wherein the cam fingers 38A are contracted towards the axis A. Each cam finger 38A may extend from a post member 64A that extends downwardly past the outward flare 52A to the cam fingers 38A. The cam fingers 38A and/or the post members 64A are configured to be articulated in a radial direction such that the cam fingers 38A expand radially into interference with the interior surface 20 in the first and second locked position. The articulation may be uni-directional via a catch and/or without elastic memory, such that once the cam fingers 38A are expanded they remain in the expanded state until otherwise physically articulated in an opposing direction. In some embodiments, each post member 64A includes a vertical column 66A (e.g. parallel to the axis A) and a catch detent 68A. During assembly, the cam finger 38A is located radially inwardly from the catch detent 68A (i.e. in the unlocked position) whereat the cam finger 38A is articulated radially outwardly and bends the catch detent 68A from an adjacent post member 64A until the cam finger 38A is snapped into engagement with an outer surface of the catch detent 68A. Accordingly, the catch detent 68A may have elastic memory to reset after bending. Each catch detent 68A may extend in the same direction (e.g. clockwise or counter-clockwise with respect to the axis A). Similarly, each cam finger 38A may extend radially in an opposite direction from the catch detents 68A (e.g. clockwise or counter-clockwise with respect to the axis A) for concerted engagement during articulation. In some embodiments, the catch detents 68A may or may not bend and the cam fingers 38A may bow and/or otherwise bend as a result of interference with the catch detents 68A.

With reference to FIGS. 3 and 4, the cam finger 38A includes an inner cam surface 70A and an outer cam surface 72A. The inner cam surface 70A may be curved, and the outer cam surface 72A may likewise be curved. The inner cam surface 70A and the outer cam surface 72A may extend from the post member 64A to a tip 74A, the tip 74A may include at least one ratchet tooth 76A. In some embodiments, the inner cam surface 70A is partially curved but flattens and/or reverses a direction of curvature near the tip 74A. During assembly, the cam finger 38A (e.g. two, three, or more cam fingers 38A) is articulated radially outwardly by the key 36A until the outer cam surface 72A makes contact with the catch detent 68A (e.g. two, three, or more catch detents 68A) and bends the catch detent 68A and/or the cam finger 38A until the tip 74A is at least partially radially outward from the catch detent 68A. In the first locked position, the catch detent 68A is in locked engagement with the at least one ratchet tooth 76A. In the second locked position, the inner cam surface 70A is in locked engagement with the catch detent 68A. Each vertical column 66A may extend from the rim portion 34A (e.g. the rim interior surface 50A) to a structural webbing 78A. The structural webbing 78A extends from each vertical column 66A to a central ring 80A. The central ring 80A defines a ring aperture 82A extending about the axis A for accommodating features of the control knob assembly 24.

Figure 6:
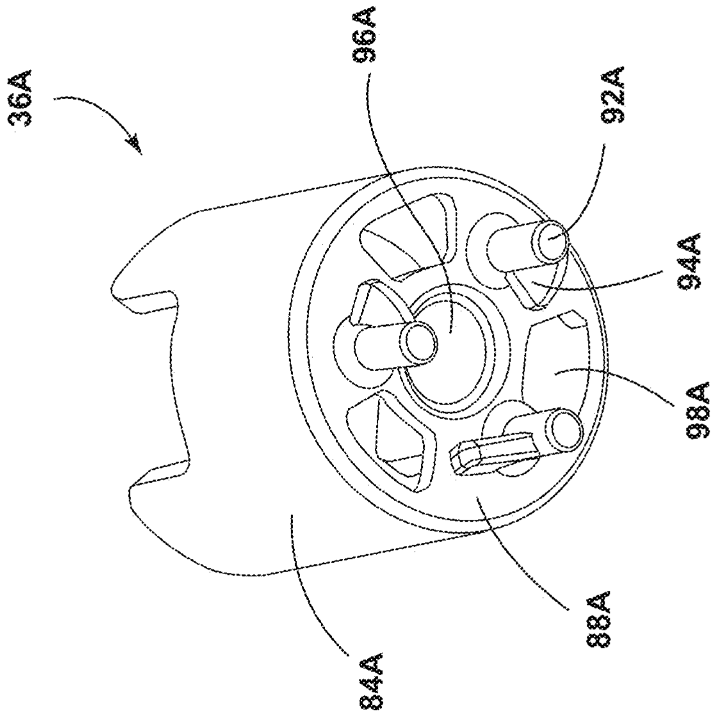
FIG. 6 is a bottom perspective view of the key according to an aspect of the present disclosure.
Figure 5:
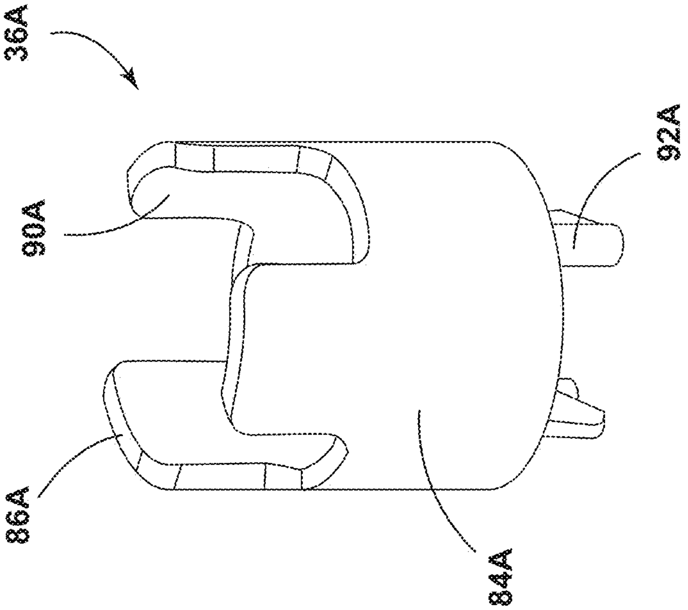
FIG. 5 is a top perspective view of a key of the bezel assembly according to an aspect of the present disclosure.

With reference now to FIGS. 5 and 6, the key 36A is illustrated from an top perspective view (FIG. 5) and a bottom perspective view (FIG. 6). The key 36A defines a sidewall 84A extending from a top key surface 86A and a bottom key surface 88A. The top key surface 86A may define a series of clasping projections 90A to facilitate rotation (e.g. by hand or tool) of the key 36A to articulate the cam fingers 38A. The bottom key surface 88A defines at least one actuating post 92A (e.g. a number of actuating posts 92A equal in number to the number of cam fingers 38A). Each of the actuating posts 92A may include a ramped surface 94A to facilitate locating the actuating posts 92A into position with respect to the cam fingers 38A. The bottom key surface 88A may define a central key aperture 96A such that, during assembly, the central key aperture 96A centers on the axis A to accommodate features of the control knob assembly 24. The bottom key surface 88A may further define a window 98A located between each of the actuating posts 92A. The burner control 26 extends through the channel 46A defined by the body interior surface 44A and connects to the knob 28 for conjoint rotation therewith. More particularly, the knob 28 includes a tube 85 (FIG. 2) defining a hollow interior and the burner control 26 is inserted into the hollow interior.

Figure 7:
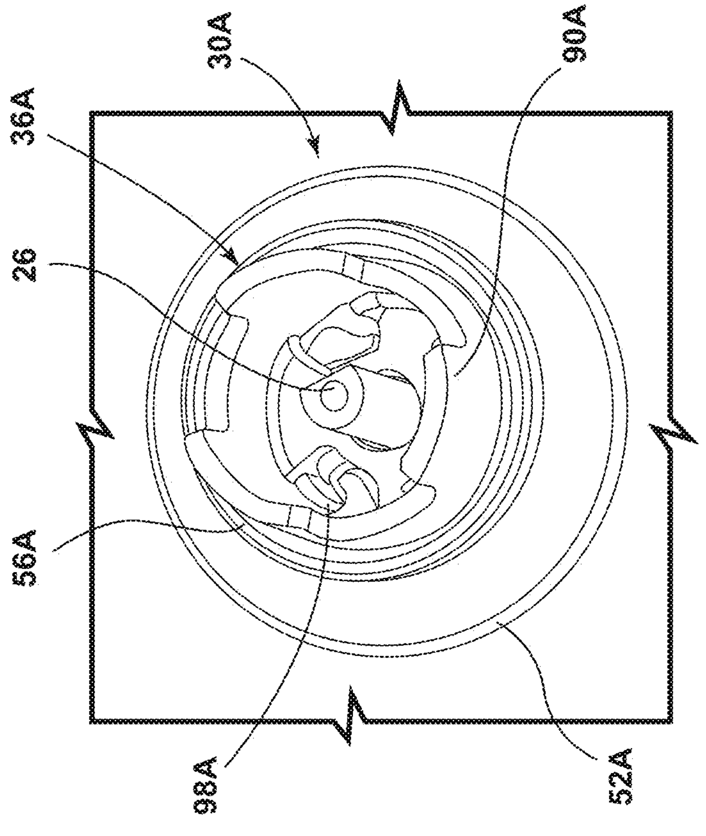
FIG. 7 is a top perspective view of the bezel assembly illustrating the bezel assembly being installed into a control panel of the cooking appliance according to an aspect of the present disclosure.

FIG. 7 is an top perspective view of the key 36A inserted into the opening 58A of the rim interior surface 50A. The windows 98A may allow an installer to view and ensure that the cam fingers 38A are in the first locked position or the second locked position prior to removal of the key 36A from the opening 58A of the rim interior surface 50A.

Figure 8:
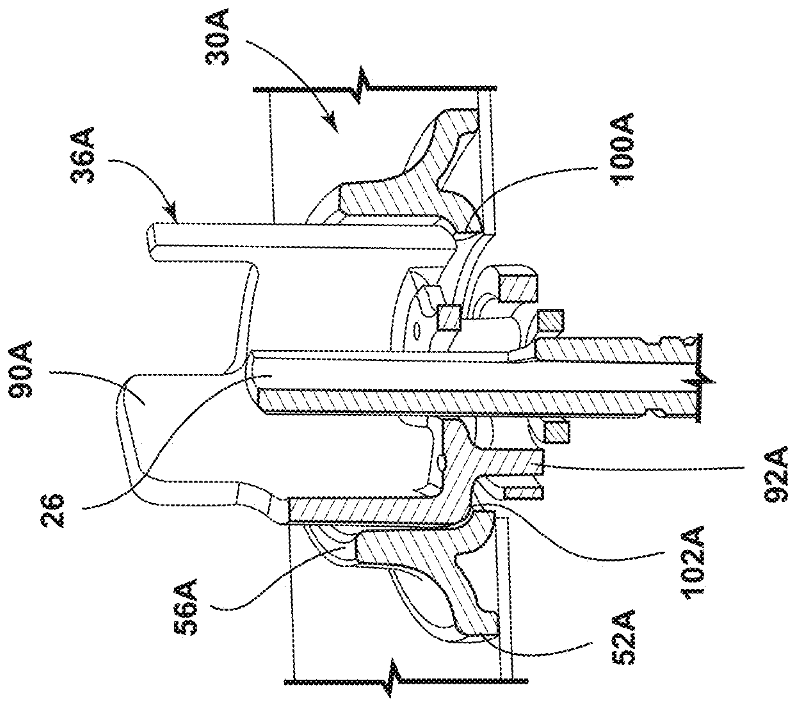
FIG. 8 is a cross-sectional view of the bezel assembly illustrating the bezel assembly being installed into a control panel of the cooking appliance according to an aspect of the present disclosure.

FIG. 8 is a cross-sectional view of the bezel assembly 30A, and the key 36A is inserted into the opening 58A of the rim interior surface 50A. The rim interior surface 50A may define an annular flange 100A that extends towards the axis A. The actuating posts 92A may be radially inset from the sidewall 84A to define an annular interface surface 102A on the bottom key surface 88A. As such, during installation, the annular interface surface 102A may come into slidable and rotational contact with the annular flange 100A. In some embodiments, the sidewall 84A of the key 36A may define a circular shape (FIG. 7) that is closely matched in shape but slightly smaller than the opening 58A of the rim interior surface 50A such that the key 36A is substantially fixed along the axis A, other than rotational movement therearound.

Figure 10:
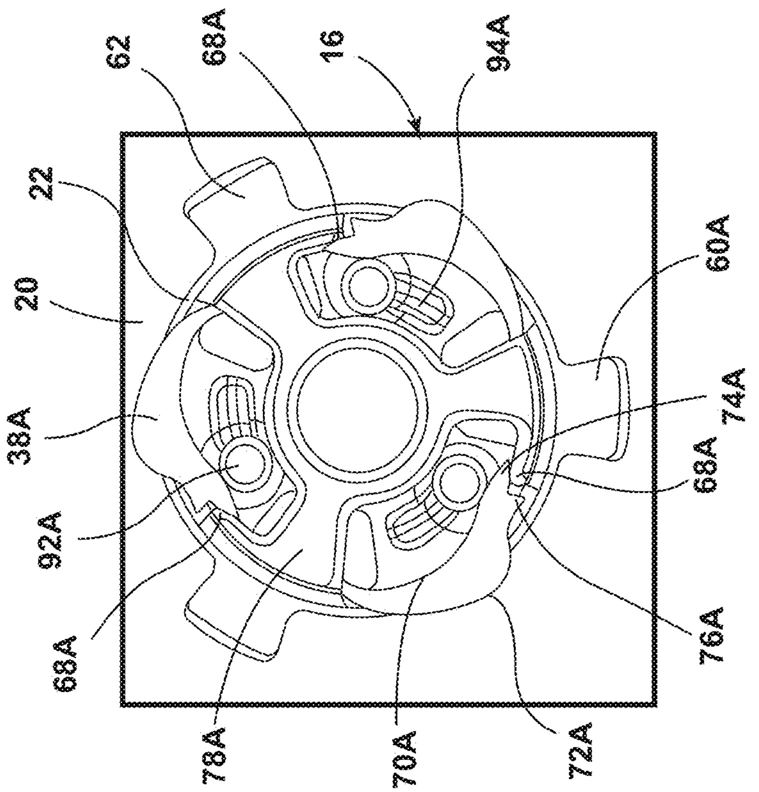
FIG. 10 is a bottom view of the bezel assembly in a first locked position according to an aspect of the present disclosure.
Figure 9:
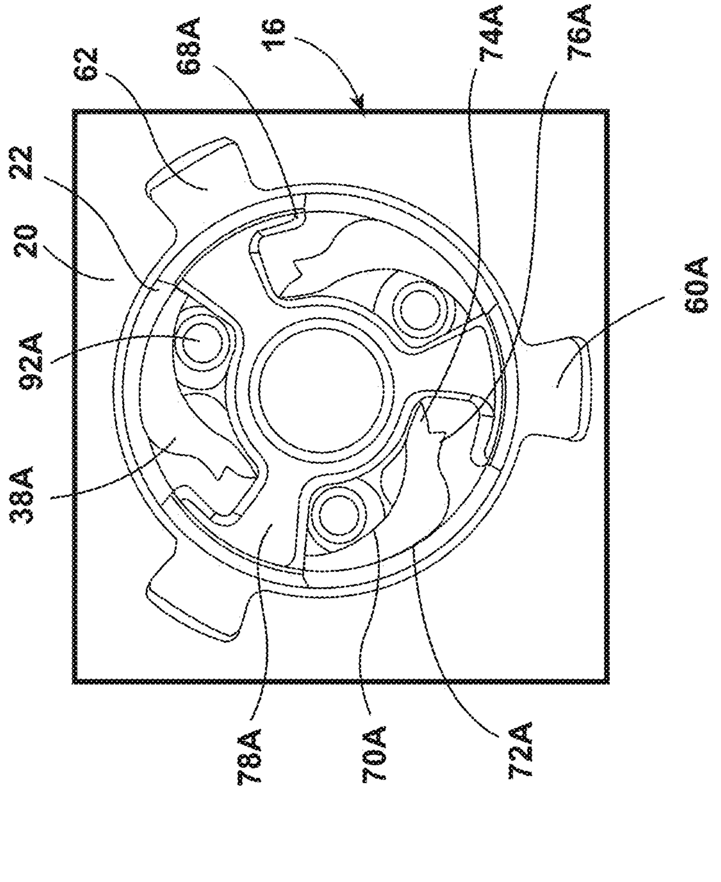
FIG. 9 is a bottom view of the bezel assembly in an unlocked position according to an aspect of the present disclosure.
Figure 11:
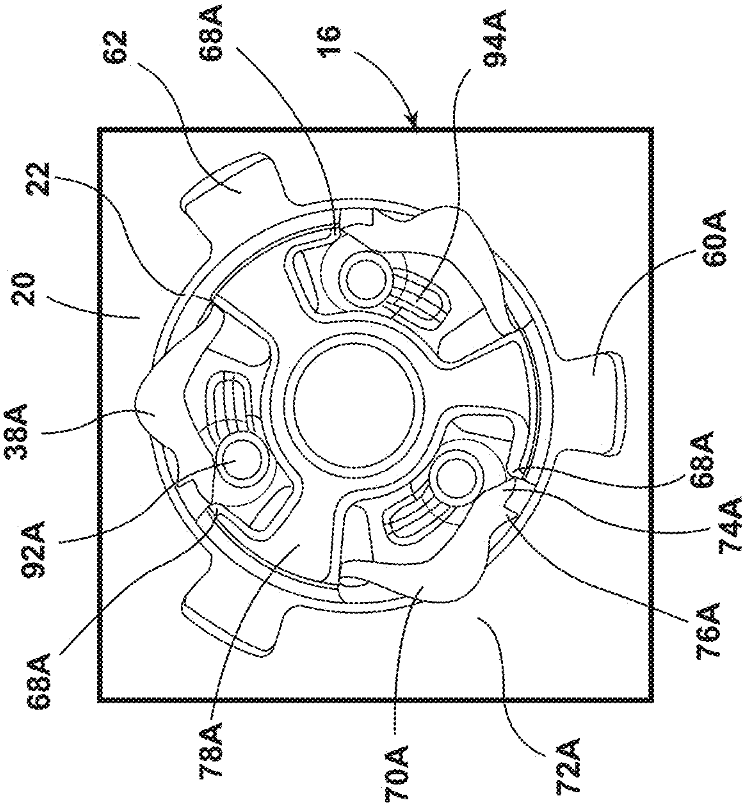
FIG. 11 is a bottom view of the bezel assembly in a second locked position according to an aspect of the present disclosure.

FIGS. 9-11 illustrate the cam fingers 38A in the various positions. More particularly, FIG. 9 illustrates the bezel assembly 30A with the cam fingers 38A in the unlocked position, wherein the outer cam surfaces 72A are located radially inwardly from the catch detents 68A. FIG. 10 illustrates the bezel assembly 30A with the cam fingers 38A in the first locked position, wherein the tip 74A is at least partially radially outward from the catch detent 68A (e.g. the catch detent 68A is in locked engagement with the at least one ratchet tooth 76A). FIG. 11 illustrates the bezel assembly 30A with the cam fingers 38A in the second locked position, wherein the inner cam surface 70A is in locked engagement with the catch detent 68A.

Figure 12:
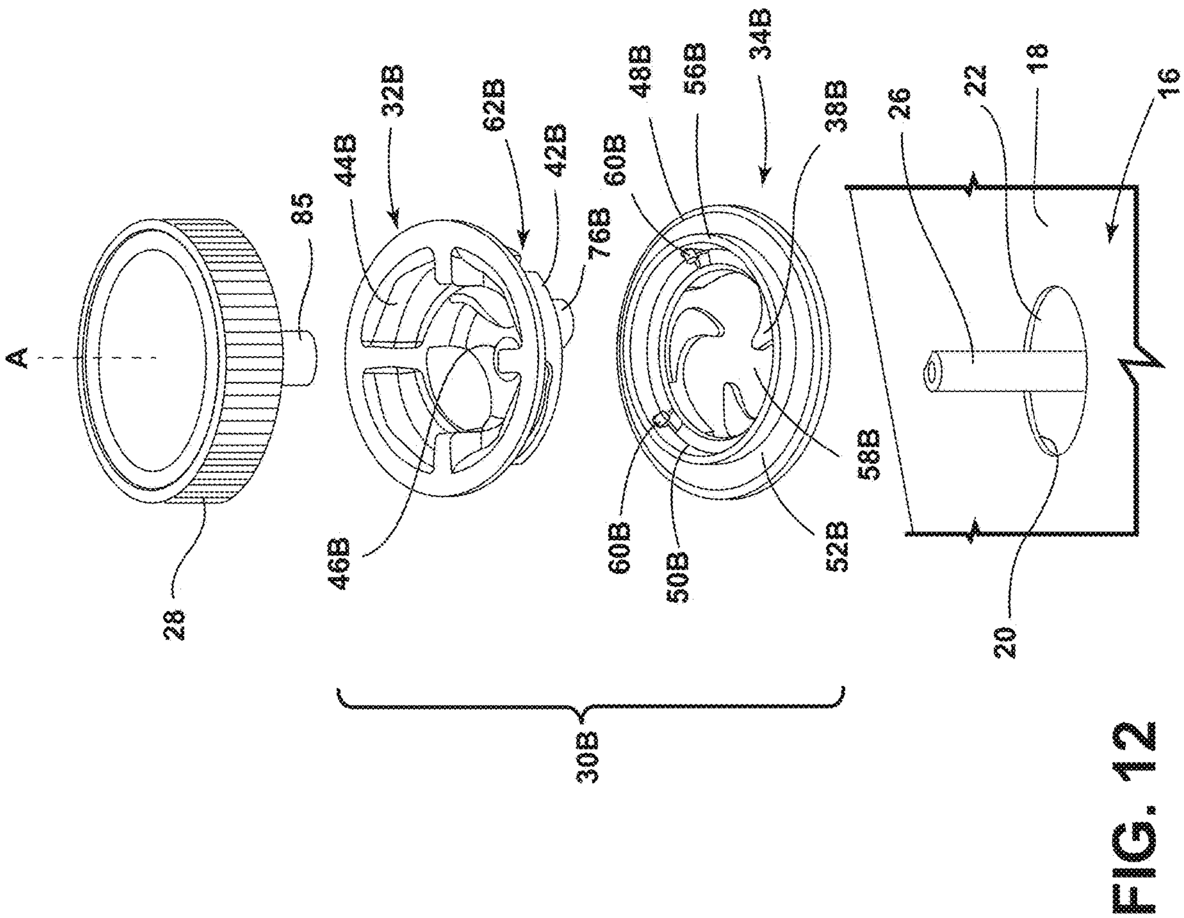
FIG. 12 is a disassembled view illustrating a second embodiment of a bezel assembly for the control knob assembly according to an aspect of the present disclosure.

With reference now to FIG. 12, a second embodiment of a bezel assembly 30B is illustrated. Unless otherwise indicated, the second embodiment may share all of the same environments, features, functions, materials, and constructions of the first embodiment. The bezel assembly 30B includes a body portion 32B and a rim portion 34B. The body portion 32B extends along an axis A and defines a head 36B. The rim portion 34B extends along the axis A and includes an interface facilitating feature (i.e. at least one cam finger 38B) extending from a stem 40B of the rim portion 34B. The at least one cam finger 38B facilitates the interface between the bezel assembly 30B and the interior surface 20. The at least one cam finger 38B may include a plurality of cam fingers 38B (e.g. two, three, four, five, or more) that may be substantially equally spaced about the axis A. The bezel assembly 30B includes an unlocked position and a locked position. In the locked position, the at least one cam finger 38B is located radially inwardly from the stem 40B with respect to the axis A. In the locked position, the at least one cam finger 38B is moved radially outwardly to flare outwardly from the stem 40B with respect to the axis A.

The body portion 32B further includes a body exterior surface 42B and a body interior surface 44B. The body interior surface 44B defines a channel 46B for accommodating features of the control knob assembly 24 and the axis A extends through the channel 46B. The rim portion 34B includes a rim exterior surface 48B and a rim interior surface 50B. The rim exterior surface 48B may define an outward flare 52B towards a bottom surface 54B of the rim portion 34B. In operation, the bottom surface 54B of the rim portion 34B contacts the exterior surface 18 of the control panel 16. As such, the outward flare 52B conceals the aperture 22 at the bottom surface 54B but narrows towards a top surface 56B of the rim portion 34B so not to impinge upon interaction with the knob 28. The body portion 32B and the rim portion 34B are non-integral. The rim interior surface 50B defines an opening 58B, and the axis A extends through the opening 58B for locating the body portion 32B therein.

Figure 14:
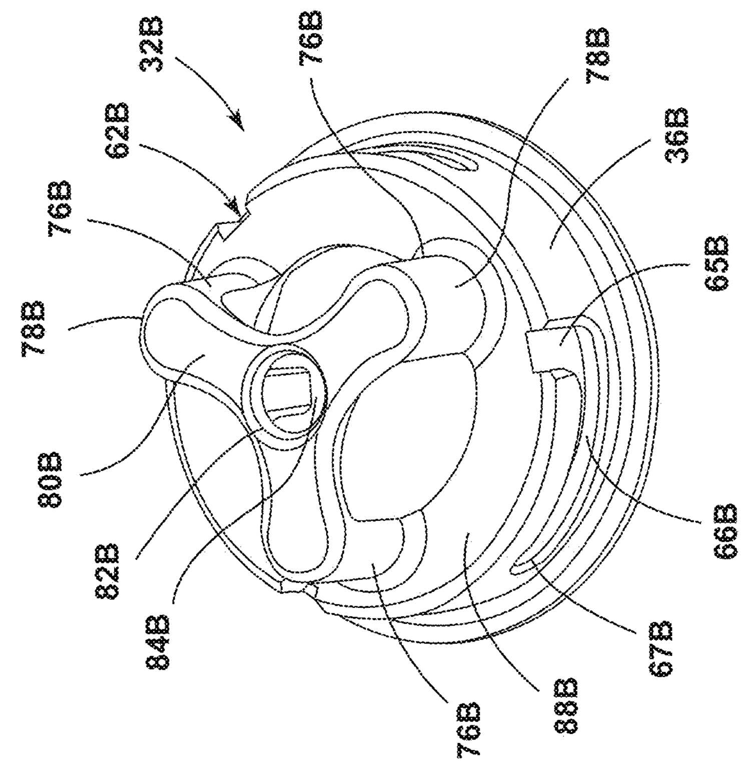
FIG. 14 is a bottom perspective view of a body portion of the bezel assembly according to an aspect of the present disclosure.
Figure 13:
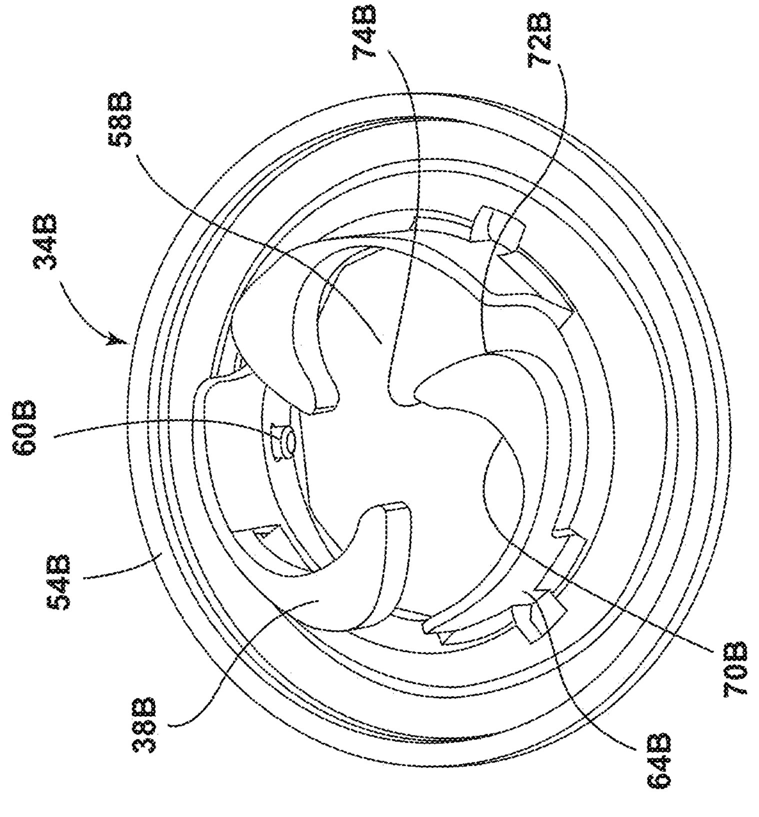
FIG. 13 is a bottom perspective view of a rim portion of the bezel assembly according to an aspect of the present disclosure.

FIG. 13 is a bottom perspective view of the rim portion 34B, and FIG. 14 is a bottom perspective view of the body portion 32B. The rim portion 34B defines at least one body portion connection feature, for example, at least one connection projection 60B (e.g. a pair of connection projections 60B) that interlocks with the body exterior surface 42B. More particularly, the body exterior surface 42B of the head 36B may define at least one body connection feature for connecting to the rim connection feature, for example, at least one track groove 62B (e.g. a two or three track grooves 62B that may be substantially diametrically located about the axis A). Each of the track grooves 62B includes a vertical section 65B and a horizontal section 66B coextensive with the vertical section 65B and extending therefrom at a transverse angle (e.g. perpendicularly) to an end 67B. The horizontal section 66B includes a protuberance 68B (FIG. 15) near the end 67B. During installation, the opening 58B defined by the rim interior surface 50B is sized to closely fit the body exterior surface 42B, such that the connection projections 60B prevent the body portion 32B from being inserted into the opening 58B incorrectly. More particularly, the connection projections 60B need to be aligned with the track grooves 62B in order to insert the body portion 32B into the rim portion 34B. During insertion, the body portion 32B is aligned with the rim portion 34B and the connection projections 60B pass through the vertical section 65B of the track grooves 62B until the connection projections 60B are vertically aligned with the horizontal section 66B, at which the body portion 32B can be rotated relative to the rim portion 34B to move the connection projections 60B near the ends 67B of the horizontal sections 66B. As the connection projections 60B approach the ends 67B, the protuberances 68B are passed securing the connection projections 60B into the ends 67B. The interface between the connection projections 60B and the protuberances 68B may make an audible "click" during rotation.

With continued reference to FIGS. 13 and 14, the cam finger 38B includes an inner cam surface 70B and an outer cam surface 72B. The inner cam surface 70B may be curved, and the outer cam surface 72B may likewise be curved. The inner cam surface 70B and the outer cam surface 72B may extend from a post member 64B to a tip 74B. The body portion 32B includes at least one actuating post 76B that extends downwardly from the head 36B (e.g. a number of posts 76B equal in number to the number of cam fingers 38B). Each actuating post 76B may include an outer post surface 78B that is curved for interfacing with the inner cam surface 70B. Each actuating post 76B extends to a structural base 80B. The structural base 80B extends from each actuating post 76B to a central annular body 82B. The central annular body 82B defines a central aperture 84B extending about the axis A for accommodating features of the control knob assembly 24.

Figure 15:
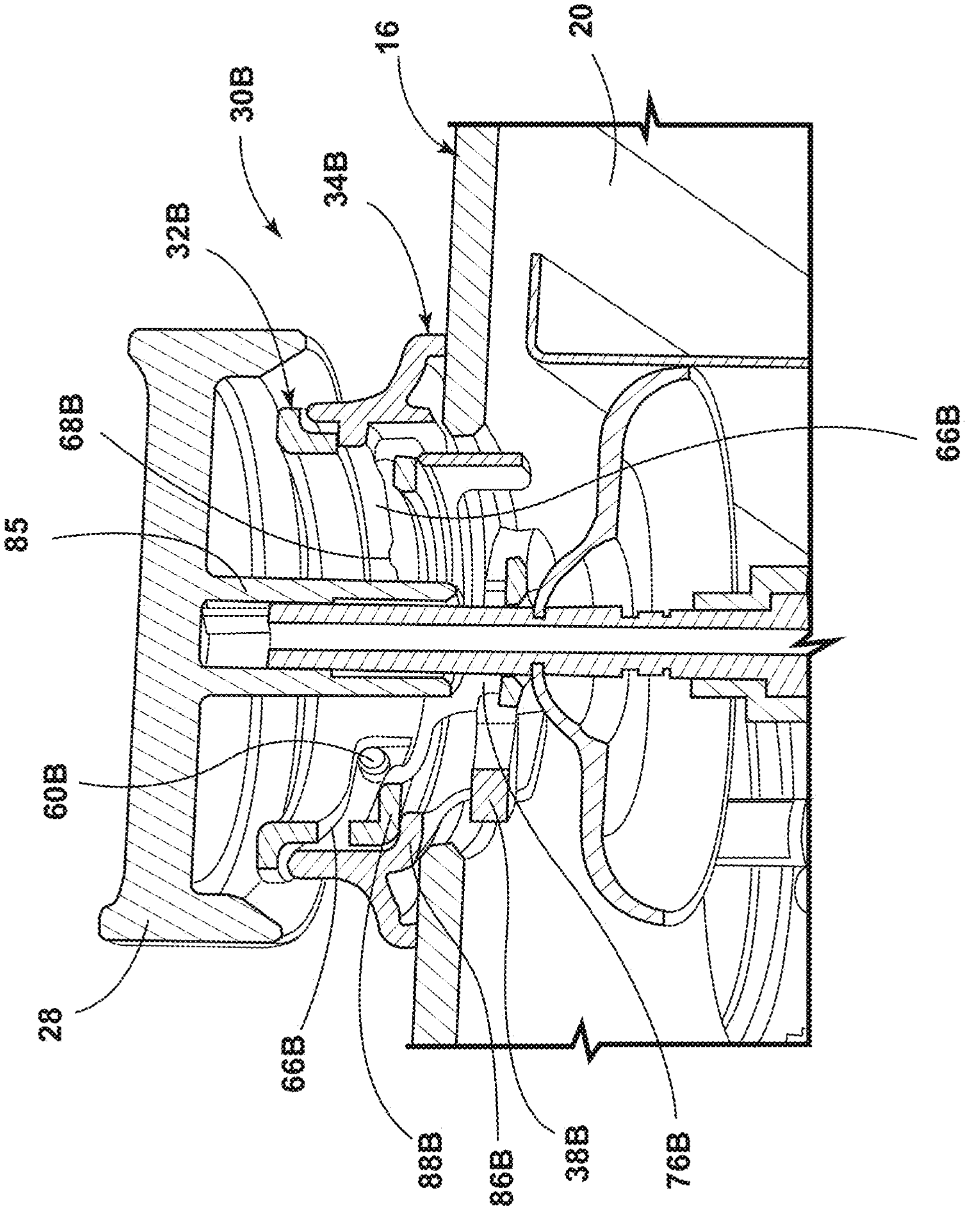
FIG. 15 is a cross-sectional view of the bezel assembly installed into a control panel of the cooking appliance according to an aspect of the present disclosure.

With reference now to FIG. 15, the rim interior surface 50A may define an annular flange 86B that extends towards the axis A. The actuating posts 76B may be radially inset from the head 36B to define an annular interface surface 88A on the bottom surface of the head 36B. As such, during installation, the annular interface surface 88B may come into slidable and rotational contact with the annular flange 86B. In some embodiments, the head 36B may define a circular shape that is closely matched in shape but slightly smaller than the opening 58A of the rim interior surface 50A such that head 36B is substantially fixed along the axis A, other than rotational movement therearound. The burner control 26 extends through the channel 46B defined by the body interior surface 44B and connects to the knob 28 for conjoint rotation therewith. More particularly, the knob 28 includes a tube 85 defining a hollow interior and the burner control 26 is inserted into the hollow interior.

Figure 17:
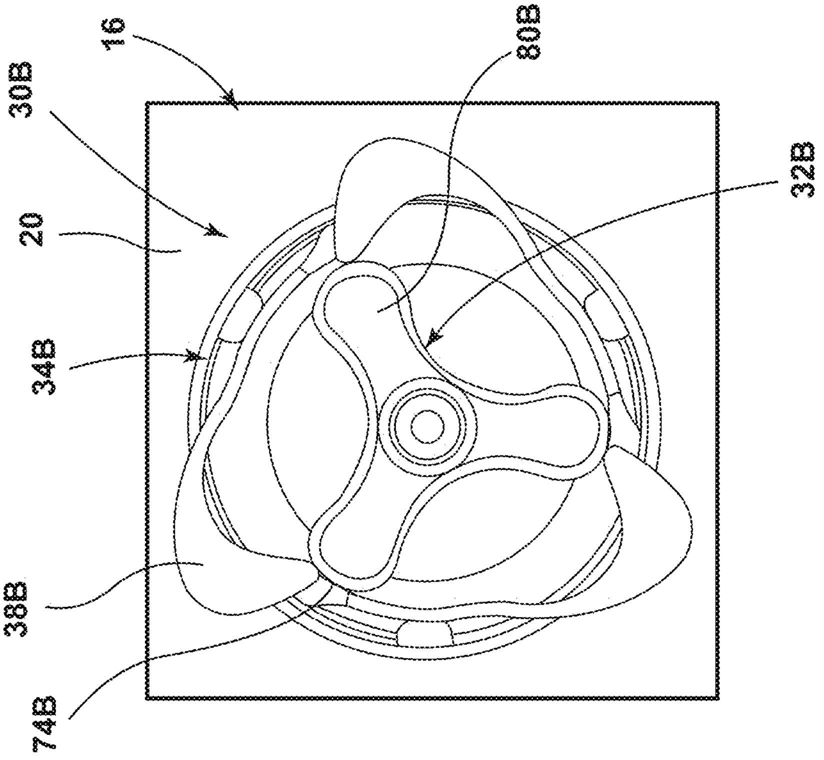
FIG. 17 is a bottom view of the bezel assembly in a locked position according to an aspect of the present disclosure.
Figure 16:
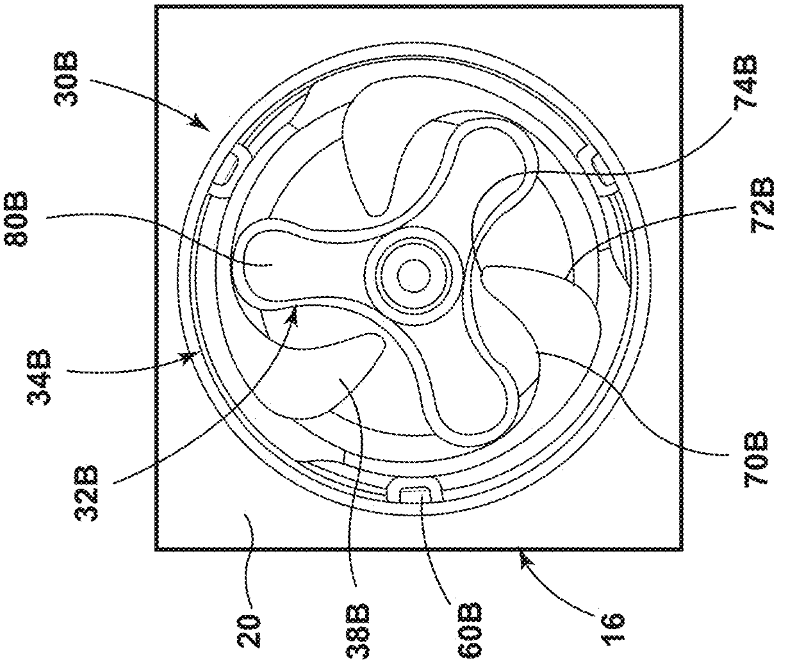
FIG. 16 is a bottom view of the bezel assembly in an unlocked position according to an aspect of the present disclosure.

FIG. 16 illustrates the bezel assembly 30B in the unlocked position, and FIG. 17 illustrates the bezel assembly 30B in the locked position. During installation, the stem 40A and the at least one cam finger 38B of the rim portion 34B is inserted into the aperture 22 defined by the control panel 16. The body portion 32B is then inserted into the opening 58B of the rim portion 34B until the annular interface surface 88B comes into contact with the annular flange 86B such that the actuating posts 76B are positioned radially inwardly from the cam fingers 38B. After insertion of the body portion 32B, the body portion 32B is rotated with respect to the rim portion 34B to articulate the at least one cam finger 38B radially outwardly until at least a portion of the at least one cam finger 38B overlaps the interior surface 20 of the control panel 16. The overlapping region between the at least one cam finger 38B overlaps the interior surface 20 of the control panel 16 preventing removal of the bezel assembly 30B from the aperture 22. The cam fingers 38B may be unidirectional and/or without elastic memory, such that, once the cam fingers 38B are articulated, they remain in the expanded state until otherwise physically articulated in an opposing direction. In other constructions, the cam fingers 38B may have elastic memory such that they are biased towards the unlocked position but prevented from contraction via the actuating posts 76B.

The invention disclosed herein is further summarized in the following paragraphs and is further characterized by combinations of any and all of the various aspects described therein.

According to one aspect of the disclosure, a bezel assembly for a control panel of a cooking appliance is provided. The bezel assembly comprises a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating components of the control knob assembly. At least one cam finger is configured to be articulated radially outwardly for interfacing with an interior surface of the control panel.

According to another aspect of the disclosure, the at least one cam finger includes a plurality of cam fingers.

According to another aspect of the disclosure, each cam finger includes an inner cam surface facing the axis that is curved.

According to another aspect of the disclosure, each cam finger extends from a post member.

According to another aspect of the disclosure, each cam finger includes an outer cam surface opposite the inner cam surface, the inner cam surface and the outer cam surface extending from the post member to a tip.

According to another aspect of the disclosure, each cam finger widens from the post member towards the tip.

According to another aspect of the disclosure, each cam finger widens from the post member to a central region and narrows to the tip.

According to another aspect of the disclosure, each cam finger includes at least one ratchet tooth.

According to another aspect of the disclosure, the body portion is insertable into the opening of the rim portion.

According to another aspect of the disclosure, the body portion defines at least one actuating post that is in axial alignment with the at least one cam finger upon insertion of the body portion into the opening of the rim.

According to another aspect of the disclosure, the body exterior surface defines at least one track groove and the rim defines at least one connection projection that is insertable into the at least one track groove.

According to another aspect of the disclosure, the at least one track groove includes a vertical section extending along the axis and a horizontal section that is transverse to the vertical section.

According to another aspect of the disclosure, a key is insertable into the channel of the body portion and the opening of the rim portion. The key includes at least one actuating post that is in axial alignment with the at least one cam finger upon insertion.

According to another aspect of the disclosure, the at least one actuating post includes a ramped surface.

According to another aspect of the disclosure, the key includes at least one clasping projection.

According to one aspect of the disclosure, a bezel assembly for a control panel of a cooking appliance is provided. The bezel assembly comprises a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating components of the control knob assembly. A plurality of cam fingers have an unlocked position and a locked position wherein the plurality of cam fingers are articulated radially outwardly from the unlocked position. A key includes a plurality of actuating posts that move the cam fingers between the unlocked and locked positions.

According to another aspect of the disclosure, the plurality of cam fingers each include an inner cam surface that is curved for interfacing with one of the plurality of actuating posts.

According to another aspect of the disclosure, the cam fingers each extend from a post member to a tip and wherein the cam fingers each include an inner cam surface facing the axis that is curved.

According to another aspect of the disclosure, each post member includes a catch detent extending towards an adjacent post member to interlock the tip in the locked position.

According to one aspect of the disclosure, a bezel assembly for a control panel of a cooking appliance is provided.

The bezel assembly comprises a body portion that extends along an axis and includes a body exterior surface and a body interior surface. The body interior surface defines a channel for accommodating components of a control knob assembly. A rim portion extends along the axis and includes a rim exterior surface and a rim interior surface. The rim interior surface defines an opening for accommodating the body portion. The rim portion includes a plurality of cam fingers having an unlocked position and a locked position, wherein the plurality of cam fingers are articulated radially outwardly from the unlocked position. The body portion includes a plurality of actuating posts that move the cam fingers between the unlocked and locked positions with relative rotation between the body portion and the rim portion. The cam fingers include elastic memory towards the unlocked position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A bezel assembly for a control panel of a cooking appliance, the bezel assembly comprising:

a body portion extending along an axis and including a body exterior surface and a body interior surface, the body interior surface defining a channel for accommodating components of a control knob assembly;

a rim portion extending along the axis and including a rim exterior surface and a rim interior surface, the rim interior surface defining an opening for accommodating components of the control knob assembly and insertion of the body portion;

at least one cam finger configured to be articulated radially outwardly for interfacing with an interior surface of the control panel; and at least one actuating post defined by the body portion that is in axial alignment with the at least one cam finger upon insertion of the body portion into the opening of the rim portion.

2. The bezel assembly of claim 1, wherein the at least one cam finger includes a plurality of cam fingers.

3. The bezel assembly of claim 2, wherein each cam finger includes an inner cam surface facing the axis that is curved.

4. The bezel assembly of claim 3, wherein each cam finger extends from a post member.

5. The bezel assembly of claim 4, wherein each cam finger includes an outer cam surface opposite the inner cam surface, the inner cam surface and the outer cam surface extending from the post member to a tip.

6. The bezel assembly of claim 5, wherein each cam finger widens from the post member towards the tip.

7. The bezel assembly of claim 6, wherein each cam finger widens from the post member to a central region and narrows to the tip.

8. The bezel assembly of claim 5, wherein each cam finger includes at least one ratchet tooth.

9. The bezel assembly of claim 1, wherein the body exterior surface defines at least one track groove and the rim portion defines at least one connection projection that is insertable into the at least one track groove.

10. The bezel assembly of claim 9, wherein the at least one track groove includes a vertical section extending along the axis and a horizontal section that is transverse to the vertical section.

11. The bezel assembly of claim 1, wherein the at least one actuating post includes a plurality of actuating posts.

12. The bezel assembly of claim 11, wherein the at least one cam finger includes a plurality of cam fingers equal in number to the plurality of actuating posts.

13. The bezel assembly of claim 1, wherein the at least one actuating post includes an outer post surface that is curved.

14. A bezel assembly for a control panel of a cooking appliance, the bezel assembly comprising:

a body portion extending along an axis and including a body exterior surface and a body interior surface, the body interior surface defining a channel for accommodating components of a control knob assembly;

a rim portion extending along the axis and including a rim exterior surface and a rim interior surface, the rim interior surface defining an opening for accommodating components of the control knob assembly;

a plurality of cam fingers having an unlocked position and a locked position wherein the plurality of cam fingers are articulated radially outwardly from the unlocked position; and a key including a plurality of actuating posts that move the plurality of cam fingers between the unlocked and locked positions.

15. The bezel assembly of claim 14, wherein the plurality of cam fingers each include an inner cam surface that is curved for interfacing with one of the plurality of actuating posts.

16. The bezel assembly of claim 15, wherein the plurality of cam fingers each extend from a post member to a tip and wherein the plurality of cam fingers each include an inner cam surface facing the axis that is curved.

17. The bezel assembly of claim 16, wherein each post member includes a catch detent extending towards an adjacent post member to interlock the tip in the locked position.

18. A bezel assembly for a control panel of a cooking appliance, the bezel assembly comprising:

a body portion extending along an axis and including a body exterior surface and a body interior surface, the body interior surface defining a channel for accommodating components of a control knob assembly;

a rim portion extending along the axis and including a rim exterior surface and a rim interior surface, the rim interior surface defining an opening for accommodating the body portion;

the rim portion including a plurality of cam fingers having an unlocked position and a locked position wherein the plurality of cam fingers are articulated radially outwardly from the unlocked position;

the body portion including a plurality of actuating posts that move the plurality of cam fingers between the unlocked and locked positions with relative rotation between the body portion and the rim portion; and wherein the plurality of cam fingers include elastic memory towards the unlocked position.

* * * * *